Aug. 27, 1929.                E. WILDHABER                1,726,091
                    METHOD OF PRODUCING HYPOID GEARS
                       Filed Feb. 4, 1927        3 Sheets-Sheet 2
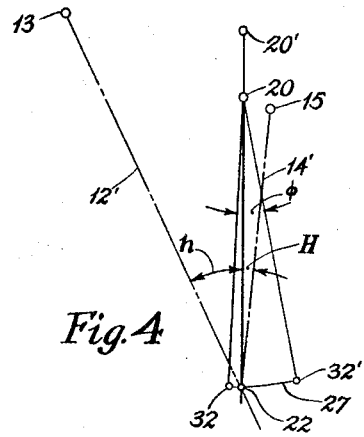
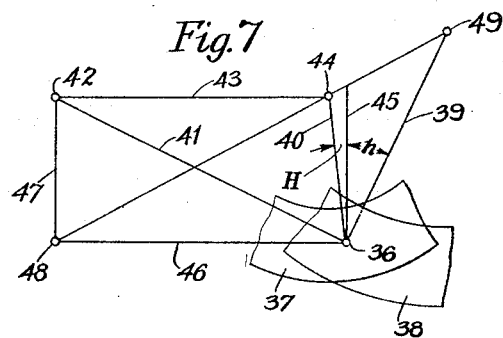
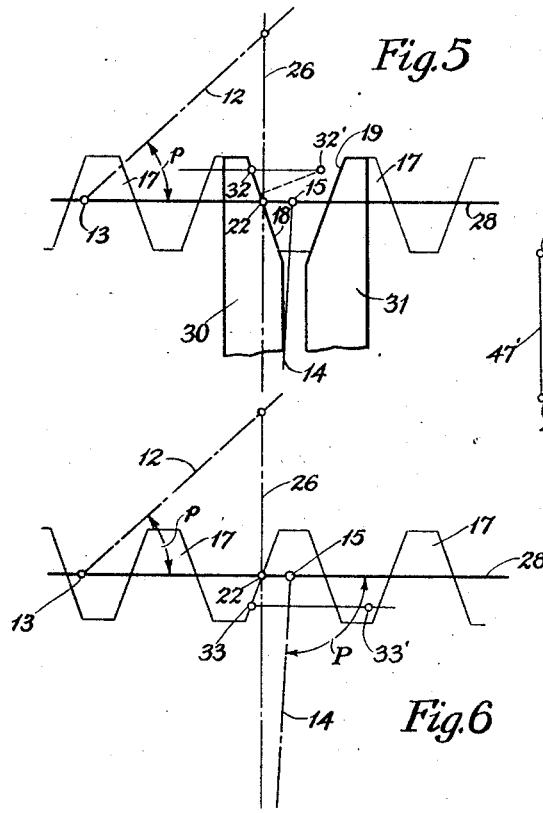
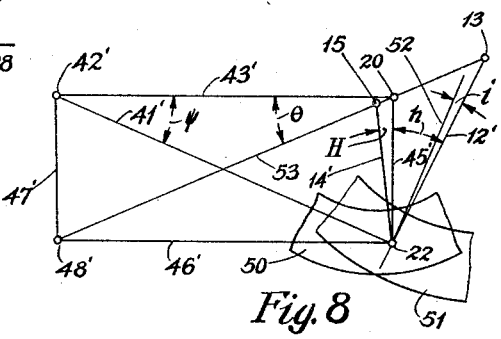
INVENTOR
*Ernest Wildhaber*
BY
ATTORNEY Aug. 27, 1929.  E. WILDHABER  1,726,091
METHOD OF PRODUCING HYPOID GEARS
Filed Feb. 4, 1927   3 Sheets-Sheet 3

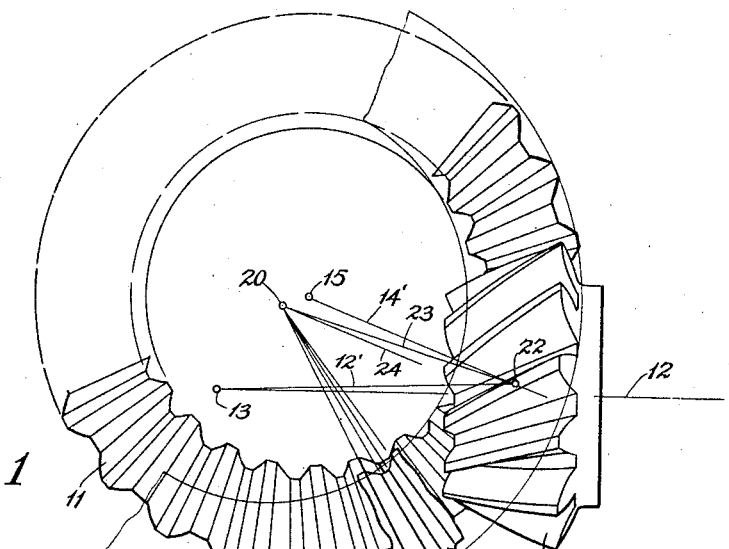
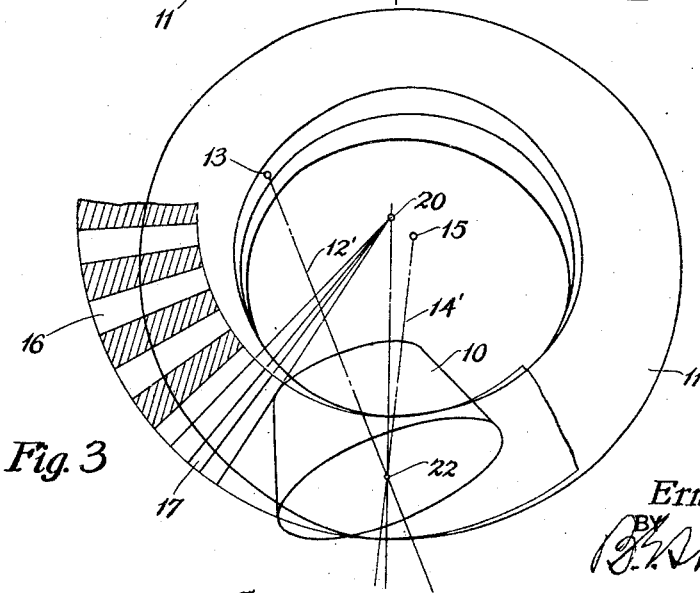

INVENTOR
Ernest Wildhaber
BY
ATTORNEY

Patented Aug. 27, 1929.

1,726,091

UNITED STATES PATENT OFFICE.

ERNEST WILDHABER, OF ROCHESTER, NEW YORK, ASSIGNOR TO GLEASON WORKS, OF ROCHESTER, NEW YORK, A CORPORATION OF NEW YORK.

METHOD OF PRODUCING HYPOID GEARS.

Application filed February 4, 1927. Serial No. 165,858.

The present invention relates to hypoid gears, or gears which mesh with axes non-intersecting and non-parallel, and to a method of producing such gears. The present invention relates, in particular, to hypoid gears having tooth surfaces such as may be produced by the movement of a planing tool in a straight path across the face of a tapered gear blank.

It is well known that it is possible to obtain a smoother finish on the tooth surfaces of generated gears than can be secured where one or both members of a pair are non-generated. Heretofore, the generation of gears of the type referred to has involved an intricate rolling operation and required a complicated machine.

The primary purpose of the present invention is to provide a method through which both members of a pair of hypoid gears may be generated in a simple operation and on machines comparable in simplicity to the machines ordinarily employed in producing straight tooth bevel gears.

A further object of this invention is to provide a pair of hypoid gears and a method for producing the same, where the gears will be capable of transmitting uniform motion and where "bias bearing", that is, a contact between mating tooth surfaces which extends diagonally across said surfaces, between the contacting tooth surfaces of the two members of a pair will be eliminated.

With the above and other objects in view, the present invention resides in the various novel features peculiar to the new gears and in the various novel steps constituting the new process of producing hypoid gears, the same being described hereinafter in the specification, illustrated in the accompanying drawings and set forth in the appended claims.

A pair of hypoid gears constructed according to the preferred embodiment of the present invention, and the preferred method of producing and proportioning said gears are illustrated in the accompanying drawings, in which:

Figures 1 and 2 are a side elevation and a plan view, respectively, of a pair of hypoid gears produced according to this invention, illustrating diagrammatically, also, their relationship to the basic gear to which they are generated conjugate;

Figure 3 is a diagrammatic view, showing a partial plan view of the basic gear from which the hypoid pair is generated, and illustrating more particularly the relationship between the two gears and this basic gear;

Figure 4 is a diagram illustrating further the relationship of the gears shown in Figure 3;

Figures 5 and 6 are diagrammatic side elevations of the basic gear shown in Figures 1 to 3 and illustrating the principles upon which opposite side tooth surfaces of hypoid gears may be cut so as to transmit uniform motion when in mesh;

Figure 9:
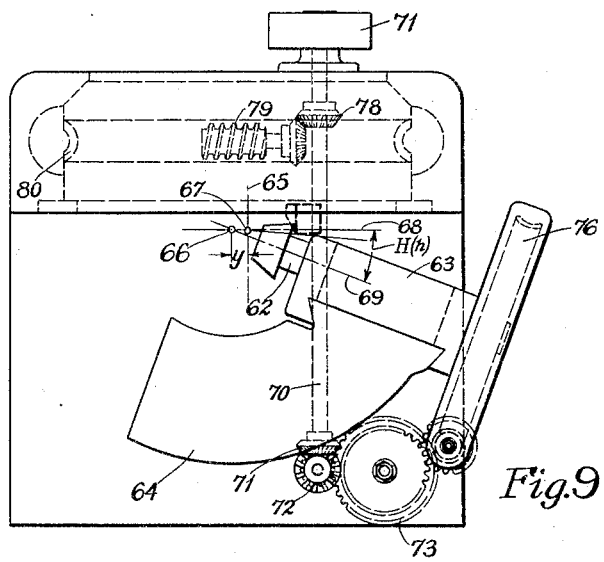
Figure 10:
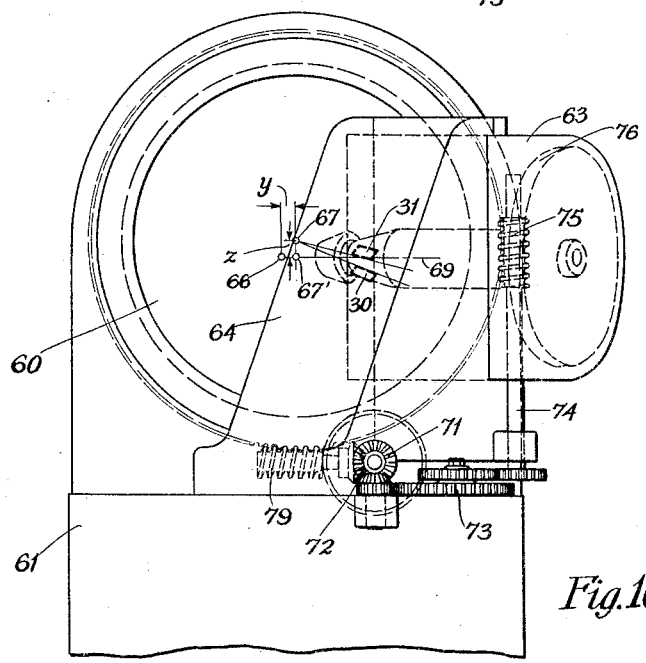

Figures 7 and 8 are diagrammatic views referring particularly to the manner of proportioning gears constructed according to this invention so as to attain the desired form of mesh and illustrating respectively, the method in which hypoid gears might be proportioned according to the principles disclosed in a prior application, and the manner in which these principles may be modified, according to the present invention to include gears of all ratios; and Figures 9 and 10 are a generally diagrammatic plan view and side elevation, respectively, showing a form of machine which might be employed in producing hypoid gears according to this invention and illustrating the preferred method of producing such gears.

With the present invention, each member of a pair of hypoid gears is produced in a generating process in which the blank is rolled relatively to the cutting tool in the manner of a gear rolling with a basic gear, other than its mate. In this generating process, the tool is given, preferably, a straight line motion and preferably two tooth sides of the blank will be cut simultaneously by reciprocating a pair of tools in straight converging paths across the face of the gear blank. One member of the pair, at least, is generated from a basic gear whose axis is offset from the axis of the blank. According to the preferred embodiment of this invention, both members of the pair are generated from a crown gear having straight radial teeth, where the axis of the crown gear is offset from, that is, non-intersecting and non-parallel to the axis of the blank. The crown gear may be a true crown gear, that is, a gear having a plane pitch surface, or a nominal crown gear, that is, a gear having a plane top surface and a conical pitch surface.

In the present invention, also, a method is provided for producing hypoid gears, in which bias bearing between the mating tooth surfaces is eliminated whether one side tooth surface only be cut at a time or whether two side tooth surfaces be produced simultaneously.

Referring now to the drawings by numerals of reference, Figures 1 and 2 show a pair of hypoid gears constructed according to the preferred embodiment of this invention, 10 indicating the pinion or smaller member of the pair and 11 the gear or larger member of the pair. These gears mesh with axes non-intersecting and non-parallel, the axis of the pinion being indicated at 12 and its apex at 13, while the gear axis is at 14 and its apex at 15. In the preferred embodiment of the invention, the gears are generated conjugate to this same crown gear and this crown gear is provided with straight radial teeth.

In Figures 1 and 2 the crown gear is imagined as interposed between the two gears to show the relationship between the gears and crown gear and their relationship to each other. The crown gear is illustrated diagrammatically at 16. Its teeth are imagined to be composed of infinitely thin layers which are interposed between the tooth surfaces of the mating gears. One tooth of the crown gear is shown at 17 in these figures. It is provided with straight sides 18 and 19 which if extended would converge at the crown gear apex 20.

The theory upon which the present invention is based is that if the pinion is generated to mesh with the crown gear teeth externally, as illustrated in Figs. 1 and 2, in such way as to transmit uniform motion and if the gear is generated to mesh with the crown gear teeth internally, as illustrated in Figures 1 and 2, in such wise as to transmit uniform motion, the gear and pinion will mesh with each other and transmit uniform motion. In these figures, 22 indicates a mean point of contact between the tooth surfaces of the pinion and crown gear and of the gear and crown gear and 14' and 12' indicate respectively, the projections of the gear and pinion axes into the plane of the crown gear. The line 23 indicates the direction of the crown gear tooth at the point of contact 22, while 24 designates the crown gear axis.

The relationship between the pair and the crown gear is further illustrated in Figure 3, in which the plane of the paper is the plane of the crown gear. Figure 4 is a further diagrammatic view illustrating the same relationship.

The axes of the gear and pinion, respectively, are shown as situated on opposite sides of the crown gear axis and intersecting the normal 26 (Fig. 5) erected at the contact point 22 perpendicular to the plane of the crown gear.

With this invention, the teeth of the gear are generated to mesh with teeth of the crown gear along certain lines which during the generating operation move relatively to the tooth surface of the crown gear. The teeth of the pinion will mesh with the same tooth surfaces of the crown gear from the opposite side and contact with them along other lines which also move on the tooth surfaces of the crown gear during the generating operation. The gear and pinion will contact with each other in the point which is the point of intersection of the lines of contact of gear and pinion, respectively, with the tooth surface of the crown gear. Like the said lines of contact themselves, this intersection point also moves relatively on the tooth surface straight to its top. Theoretically, of course, the contact between the gear and pinion, at any one instant, is only in a point or in points. Actually, however, the deviation from line contact is so small that it only produces a desirable reduction of the bearing area between the contacting tooth surfaces of the gears and hence permits of the gears adjusting themselves readily to conditions of service and use.

By generating the gears in the manner described, with the points of contact between their tooth surfaces moving on the tooth surface of the crown gear from top to bottom, bias bearing will be entirely eliminated. In Fig. 4, 27 designates a line which is perpendicular to the general direction of the crown gear teeth. If the tooth contact between the pair of hypoid gears takes place on this line, the contact will extend straight up on the tooth of the basic crown gear. The conditions under which both gear and pinion can contact in the same points of such a line with the crown gear and with each other will now be investigated. This investigation can be confined to the area in the immediate vicinity of the point 22 being considered. It is unnecessary to consider the whole height of the teeth because if the tooth bearing extends straight upwardly in the center of the tooth height slight departures from the general direction of the tooth bearing are entirely negligible.

Figures 5 and 6 are diagrammatic views showing the gears of Figure 3 in side elevation. Only a few teeth 17 of the crown gear are shown for the sake of clearness and the position of gear and pinion relative to the crown gear are indicated simply by the positions of their respective axes and apexes. The heavy black line 28 indicates the pitch plane of the crown gear. To secure the desired form of tooth bearing between the hypoid gears, the point of contact between each of these gears and the crown gear tooth surfaces 18 and 19 which may be represented during the generating operation by the planing tools 30 and 31, should move substantially from the bottom to the top of the crown gear tooth surfaces, as already stated.

Let us now consider a point 32 lying on the preferably straight tooth profile of the crown gear and above the pitch plane 28 by an amount $s$. It is a general law of gearing operating with uniform motion that the moments or torques produced by forces extending along the tooth normals at any point of contact must all be in a constant ratio. Let us assume, for instance, that the point 32 becomes a point of contact between the gears and crown gear when it has moved to the position 32'. Inasmuch as point 32 is at the same distance from the axis 20 of the grown gear as the point 22 and inasmuch as the perpendicular to the tooth surface, at 32 or 32' has the same inclination to and the same distance from said axis 20, the moment exerted upon the crown gear by a force acting at 32 or 32' in the direction of said perpendicular is equal to the moment exerted by an equal force acting in the direction of the perpendicular at point 22. In other words, the increment of the moment exerted upon the crown gear at 32' over the moment exerted at 22 is zero.

If 32' is actually a point of contact between the tooth surface of a gear and the tooth surface of the crown gear, then the increment moment exerted upon the gear at 32' over the moment exerted at 22 is also zero, in conformance with the stated law of uniform motion gearing. Also, if 32' is a point of contact between the tooth surfaces of the crown gear and pinion, the increment moment at 32' exerted upon the pinion must be zero. Now, if the said increment moment at 32' is zero on both members of the pair of gears, then tooth contact takes place between the gears at 32', provided, of course, that 32' is a point within the reach of the teeth during their mesh and provided, of course, that no interference takes place.

In Figure 5, the point 32 is above the pitch plane and lies on one side tooth surface of the crown gear. That the same considerations apply to the other side tooth surface of the crown gear and to points lying below the pitch plane is clear from Figure 6, where 33 designates a point lying on the profile of the crown gear tooth below the pitch plane 28 and 33' the position assumed by the point 33 when it becomes a point of contact between either of the gears and the crown gear tooth surface, or the cutting edge which represents that surface.

The increment moment on the pinion or gear is composed of the change in moment when moving the normal force from 22 to 32, of the change in moment when moving said force from 32 to 32' while maintaining it in parallel position, and of the change in moment when turning said normal force at 32' by an angle $\phi$ about an axis parallel to the crown gear axis.

For convenience, the following symbols are employed:

$A_1$ = the cone distance of the gear = distance 15—22, measured in the plane of the crown gear.

$A_2$ = the cone distance of the pinion, the distance 13—22.

$A_3$ = the distance from the crown gear center to the mean contact point, the distance 20—22.

$h$, $H$ = the inclination angles or spiral angles of the teeth of the pinion and gear respectively, see Fig. 4.

$p$, $P$ = the pitch angles of pinion and gear respectively, the angles included by the axes 12 and 14, respectively, with the plane 28 of the crown gear, see Figs. 5 and 6.

$a$ = the pressure angle of the crown gear teeth.

$x$ = the distance from 32 to 32'.

$s$ has already been used to designate the distance of the point under consideration, the point 32, above the pitch plane 28.

The increment moment $dM_1$ of the pinion can then be expressed as follows, assuming a normal force of unity ($=1$):

$$dM_1 = -\frac{s}{\cos^2 a} \cdot \cos h \cdot \cos p \cdot \cos a + x \cdot \sin a \cdot \cos h \cdot \cos p + A_2 \cdot \sin h \cdot \frac{x}{A_3} \cdot \sin p \cdot \cos a$$

For the other side of the teeth, see Figure 6, the corresponding equation is:

$$dM_1 = +\frac{s}{\cos^2 a} \cdot \cos h \cdot \cos p \cdot \cos a - x \cdot \sin a \cdot \cos h \cdot \cos p + A_2 \cdot \sin h \cdot \frac{x}{A_3} \cdot \sin p \cdot \cos a$$

Each of these increment moments must be zero, according to our hypothesis that 32 or 33, as the case may be, will become a point of contact between the sides of the pinion teeth and the sides of the crown gear teeth during generation.

The two equations can be summed up in the following single equation:

$$(1) \quad dM_1 = \mp \frac{s}{\cos^2 a} \cdot \cos h \cdot \cos p \cdot \cos a \pm x \cdot \sin a \cdot \cos h \cdot \cos p + A_2 \cdot \sin h \cdot \frac{x}{A_3} \cdot \sin p \cdot \cos a = 0$$

In a similar manner the combined equation is obtained for the increment moments $dM_2$ on the gear, the upper sign referring to the tooth side shown in Figure 5, and lower sign referring to the tooth side shown in Figure 6:

$$(2) \quad dM_2 = \pm \frac{s}{\cos^2 a} \cdot \cos H \cdot \cos P \cdot \cos a \mp x \cdot \sin a \cdot \cos H \cdot \cos P - A_1 \cdot \sin H \cdot \frac{x}{A_3} \cdot \sin P \cdot \cos a = 0$$

According to Equation (1):

$$(3) \quad \pm \frac{s}{x \cos^2 a} = \pm \tan a + \frac{A_2 \tan h \tan p}{A_3}$$

According to Equation (2):

$$(4) \quad \mp \frac{s}{x \cos^2 a} = \mp \tan a - \frac{A_1 \tan H \tan P}{A_3}$$

For the same tooth side, in order to transmit uniform motion, $$\frac{s}{x \cos^2 a}$$

must be the same on gear and pinion. In other words, the sum of Equations (3) and (4) equals zero. Whence:

$$(5) \quad A_2 \tan h \tan p = A_1 \tan H \tan P$$

If this equation is fulfilled, that is, if the cone distances, tooth inclinations, and pitch angles of a pair of hypoid gears be selected so as to bear the above relation to each other, the gears will have a desirable tooth bearing, without bias on either side of the teeth. It is to be noted, that both sides of the teeth are conjugate to the same crown gear and may therefore be simultaneously produced on a two tool generator.

The relation of Equation (5) contains a certain restriction as to the tooth inclination or spiral angle, since both gears are generated from a single basic crown gear having straight radial teeth. The present invention, is, however, not restricted to the generation of both members of the pair from such a crown gear. The two gears of a pair may be generated from different crown gears which are not complementary and where one of the crown gears, at least, is provided with non-radial teeth. The two tooth sides of the pinion might also be cut in separate operations, in which case the gear would preferably be provided with straight radial teeth and might be cut on a standard bevel gear generator exactly like a bevel gear, without offsetting the axis of the blank from the axis of the generating crown gear. In this case, of course, the pinion blank axis would be offset from the axis of the generating crown gear during the generation of each of the tooth sides thereof. However, it has been found that the inclination or spiral angles obtained where the gears are constructed according to Equation (5) are those which are most suitable for ordinary usage.

In my prior pending application No. 29,553, filed May 11, 1925, I have shown how a pair of hypoid gears might be proportioned so as to avoid undercut on the teeth of the gears and so as to provide a pinion of increased size as compared with a bevel pinion of the same ratio. As pointed out in that application, these qualities may be obtained by proportioning the gears of the pair so as to mesh substantially along the projection of the pinion axis projected into a plane tangent to their pitch surfaces.

The principles for proportioning the gears so as to obtain this mesh are fully disclosed in the application mentioned. They may, however, be briefly recalled here by reference to Figure 7. 36 is a mean contact point, corresponding to the point 22 already referred to, between the gear and pinion whose pitch surfaces developed into a plane, the plane of the drawings, tangent to the gears at the mean contact 36, are shown fragmentarily at 37 and 38, respectively in Figure 7. The angle between the projected pinion axis and gear axis is assumed. The location of the pinion apex may then be determined as follows: Draw the line 41 through the contact point 36 perpendicular to the line of action, the projected pinion axis 39, and locate the intersection point 42 of this line 41 with the line 43 drawn through the gear apex 44 perpendicular to the straight line 45 indicating the direction of the teeth of the gear with which the pinion is rolled. Draw line 46 through the contact point 36 parallel to line 43 and draw line 47 through point 42 parallel to line 45. The line connecting the intersection point 48 with the apex 44 of the gear intersects the projection 39 of the pinion axis in the pinion apex 49.

The method of proportioning the gears as disclosed in Figure 7 is limited to large ratios or reductions. The present invention refers, however, to miter gears and low ratios or reductions as well as high ratios or reductions. It is necessary, therefore, to provide a factor which will take care of all reduction ratios. For this purpose, it is preferred to construct gears, generated according to the principles laid down in this invention, according to the manner disclosed in Figure 8. Figure 8 is similar to Figure 7, showing the development of the pitch surfaces of gear and pinion into a plane tangent to the pitch surfaces at a mean contact point 22. 50 and 51 indicate the developed pitch surfaces of the gear and pinion respectively. In place of a line of action extending along the projected pinion axis 12', another line of action 52 is chosen whose inclination angle $i$ to the projected pinion axis 12' may be determined as:

$$(6) \quad \cotan i = \cotan(H+h) + \frac{N \cos p}{n \cos P \cdot \sin(H+h)},$$

where $N$ and $n$ are the tooth numbers of the gear and pinion respectively.

The relation of Equation (6) may be treated as an assumption, and it is therefore not deemed necessary to outline its derivation.

For miter gears, the ratio of the tooth numbers in development is $$\left(\frac{N \cos P}{n \cos p} = 1\right), \text{ and } H=h.$$

In other words, the line 52 will then be midway between the projected gear and pinion axes 12' and 14' respectively. Line 41' is now drawn through contact point 22 perpendicular to the line of action 52. Intersection point 42' of line 41' with line 43' is now located, 43' being perpendicular to the line 45' which indicates the direction of the teeth of the crown gear whose center is at 20. Draw line 46' through 22 parallel to 43' and line 47' parallel to 45'. The line 53 connecting the intersection point 48' with the crown gear center 20 intersects the projection 12' of the pinion axis in the pinion apex 13 and the projection 14' of the gear axis in the gear apex 15.

This construction can be expressed in the following formula, considering that the angles $\Psi$ and $\Theta$ are equal to $(h-i)$, that the angle included between the projected gear and pinion axes equals the sum of their tooth inclinations or spiral angles, $(H+h)$, and that the angle at the point 13 between the line 53 and the projected pinion axis $12'=90°-(2h-i)$. Whence:

$$(7) \quad \frac{A_2}{A_1} = \frac{\cos(h-H-i)}{\cos(2h-i)}$$

Now the moments exerted upon gear and pinion by a force at 22 normal to the respective tooth surfaces must be in the ratio of the respective numbers of teeth $\frac{N}{n}$ of the gear and pinion.
Hence:

$$(8) \quad \frac{A_2 \sin p \cos h}{A_1 \sin P \cos H} = \frac{n}{N}; \text{ or } \frac{A_2}{A_1} = \frac{n}{N} \cdot \frac{\sin P \cos H}{\sin p \cos h}.$$

Gear pairs made according to this invention will preferably be so proportioned that they fulfill simultaneously the three Equations (5), (7) and (8). The method of producing gears according to the preferred embodiment of this invention is illustrated diagrammatically in Figures 9 and 10. According to the preferred embodiment, each member of the pair is generated by rolling the blank relatively to the tool in the manner of a gear meshing with a basic gear where the axis of the blank is offset from the axis of the basic gear. According to the preferred embodiment of the invention, the basic gear is a true crown gear and the tools move in converging paths across the face of the blank, representing opposite side tooth surfaces of the crown gear.

In Figures 9 and 10, the planing tools 30 and 31 are mounted upon the cradle or carrier 60 which is mounted for rotary or oscillatory movement on the frame 61 of the machine. The means for reciprocating the tools across the face of the blank are not shown, but they may be of any suitable character, and of the type usually employed in two tool bevel gear generating machines.

The blank B, which may be either a gear or pinion blank, is mounted upon a spindle 62 which is journaled in a slide 63 which is vertically adjustable upon the upright or column 64 mounted on the frame 61. The slide 63 may be adjusted on the upright 64, by any suitable means not shown, to position the blank axis at any desired distance above or below the axis of the crown gear or basic gear upon which the blank is to be rolled, which axis is represented by the axis 65 of the cradle 60.

In the case of the pinion blank particularly, though in some pairs, in the case of the gear blank, also, the blank is adjusted to its pitch angle $P$ or $p$, in such manner that its apex 66 is a distance $y$ beyond the projection 67' of the crown gear center 67 to the projection of the pinion axis 68. In other words, the blank is so positioned that its apex 66 is outside a line drawn from the crown gear axis 65 perpendicular to the projection 68 of the pinion axis into the pitch plane of the crown gear, or plane tangent to the pitch surfaces of gear and basic gear at a mean contact point. The distance $$y = A_2 - A_3 \cos h.$$

The offset $z$ of the axis 69 of the blank from the axis 65 of the cradle, or its basic gear, is determined in a similar manner, as:

$$z = A_3 \sin h.$$

The two reciprocating tools 30 and 31 are set apart so as to operate on opposite tooth sides of the same tooth or of different teeth. In the machine illustrated, they move radially of the crown gear axis 65, representing side tooth surfaces of a crown gear having straight radial teeth. During the cutting operation, the blank rotates on its axis 69 and simultaneously an additional relative movement is imparted between the tools and blank about the axis of the crown gear, effected by movement of the cradle 60 upon its axis 65.

The ratio R between the crown gear and blank is:

$$R = \frac{A_3}{A_2 \sin p \cos h}.$$

Means for rotating the blank on its axis and simultaneously moving the cradle on its axis are shown diagrammatically in Figures 9 and 10. The drive may be derived from a main shaft 70 which carries a pulley 71 which is driven from any suitable source of power. The main shaft 70 is connected with the blank spindle 62 through the bevel gears 71 and 72, the index change gears 73, the worm shaft 74, the worm 75 and the worm wheel 76 secured to the blank spindle 62. The cradle 60 may be driven from the shaft 70 by means of bevel gears 78, the worm 79 and the worm wheel 80 which is secured to the cradle.

The gears may be cut in an intermittent, that is, periodic, or a continuous indexing operation. In the first case, one tooth side will be completed by each of the tools and then the tools and blank will be withdrawn relatively to each other and the blank indexed to present another tooth for operation upon by the tools when the blank has been returned into cutting engagement. In this case, means, of course, will be provided for withdrawing the tools and blank relatively to each other after completion of one cutting operation upon one tooth and means will also be provided for periodically indexing the blank spindle and for reversing the movement of the cradle. These parts may be the same as are employed in machines for generating bevel gears and are not illustrated here for the sake of clearness.

Where the blank is continuously indexed, the tools perform their reciprocating motion while the blank rotates continuously in one direction and the cradle moves continuously in one direction. In this case, the teeth of the crown gear will not be straight but of spiral form. In this case means will be provided for maintaining a timed relation between the tools and blank during the movement of the cradle, as is usual in machines operating upon the continuous indexing or hobbing principle.

It will be understood that the tools cut on their stroke in one direction only and are clapped out of cutting position on the return stroke. The clapping mechanism has not been illustrated but may be of any usual or suitable character. The adjustments of tools and blank may be effected in any usual or suitable way, also.

The present invention is applicable not only to the production of gears conjugate to a straight tooth basic gear, but also to the production of gears conjugate to a curved tooth basic gear, if the spiral angles $h$ and $H$ will fulfill the same equations, namely Equation (5).

The present invention is not restricted to the production of gears conjugate to a basic gear having teeth of straight profile but can be used equally well if curved basic profiles are employed. In this latter case, preferably two different pairs of tools will be used on gear and pinion, which pairs have complementary profiles.

When the gears are constructed according to the preferred embodiment of this invention, that is, according to Equation (5) the gears will both be of the same hand.

The profiles of the one tooth side of the gears are somewhat more curved than the profiles of the opposite sides of the teeth and are, therefore, more easily subject to undercut. This may be avoided, however, by providing an increased pressure angle on the tooth sides which are more curved.

It is to be noted with respect to Formula (5) that it contains no restriction regarding the selection of the cone distance $A_3$ of the crown gear. The crown gear axis may accordingly, be located anywhere along the line 20—22 (Fig. 4) as at 20' without altering the conditions fulfilled by gears proportioned according to this equation. By changing the location of the crown gear center any desirable longitudinal mismatch between the tooth surfaces of the gears can be produced. Preferably the point 20' will be chosen that the same mismatch results on both sides of the teeth.

While the invention has been described particularly with reference to certain preferred embodiments, it will be understood that it is not intended to limit it to the modifications discussed, but that this application is intended to cover any variations, uses, or adaptations of the invention following, in general, the principles of the invention and including such departures from the present disclosure as come within known or customary practise in the gear art and may be applied to the essential features hereinbefore set forth and as fall within the scope of the invention and the limits of the appended claims.

Having thus described my invention, what I claim is:

1. The method of producing the side tooth surfaces of a hypoid gear which consists in reciprocating a tool in a straight line across the face of a tapered gear blank while imparting a relative rolling movement between the tool and blank corresponding to that of a gear rolling with a crown gear with its axis non-intersecting and non-parallel to the axis of the crown gear.

2. The method of producing the side tooth surfaces of a hypoid gear which consists in reciprocating a tool in a straight line across the face of a tapered gear blank while imparting a relative rolling movement between the tool and blank corresponding to that of a gear rolling with a crown gear whose axis is offset from the blank axis and intersects the tool path.

3. The method of producing a hypoid gear which consists in cutting its side tooth surfaces by moving a tool in a straight line across the face of a tapered gear blank while simultaneously producing a relative motion between the tool and blank corresponding to that of a gear meshing with a basic gear, other than its mate, whose axis is offset from the axis of the blank.

4. The method of producing a hypoid gear which consists in cutting its side tooth surfaces by moving a tool in a straight line across the face of a tapered gear blank while producing a relative motion between the tool and blank corresponding to that of a gear meshing with a basic gear, other than its mate, whose axis intersects the straight line path of the tool and is offset from the axis of the blank.

5. The method of producing a pair of hypoid gears which consists in generating the side tooth surfaces of each member of the pair by moving a tool across the face of a tapered gear blank while rotating the blank on its axis and simultaneously imparting a relative movement between the tool and blank about an axis offset from the blank axis.

6. The method of producing a pair of hypoid gears which consists in generating the side tooth surfaces of each member of the pair by reciprocating a tool in a straight line across the face of a tapered gear blank while rotating the blank on its axis and simultaneously imparting an additional relative movement between the tool and the blank about an axis offset from the blank axis.

7. The method of producing a pair of hypoid gears which consists in generating the side tooth surfaces of each member of the pair by moving a tool across the face of a tapered gear blank while imparting a relative rolling movement between the tool and blank in the manner of a gear rolling with a crown gear with its axis offset from the axis of the crown gear.

8. The method of producing a pair of hypoid gears which consists in generating the side tooth surfaces of each member of the pair by reciprocating a tool in a straight line across the face of a tapered gear blank while imparting an additional relative rolling movement between the tool and blank in the manner of a gear rolling with a crown gear with its axis offset from the axis of the crown gear.

9. The method of producing a pair of hypoid gears which consists in generating the side tooth surfaces of each member of the pair by moving a tool in a straight path across the face of a tapered gear blank while imparting a relative rolling movement between the tool and blank in the manner of a gear meshing with a crown gear, the axis of the crown gear in the case of at least one member of the pair being offset from the axis of the blank being cut.

10. The method of producing a pair of hypoid gears which consists in generating the side tooth surfaces of each member of the pair by moving a tool in a straight path across the face of a tapered gear blank while rotating the blank on its axis and simultaneously moving the tool and blank relative to each other about another axis, the latter axis in the case of one member of the pair, at least, being offset from the axis of the gear blank being cut.

11. The method of producing a pair of hypoid gears which consists in generating the side tooth surfaces of each member of the pair by moving a tool in a straight path across the face of a tapered gear blank while imparting a relative rolling movement between the tool and blank in the manner of a gear meshing with a crown gear, the tool path in the case of one member of the pair, at least, extending in a direction radially of the crown gear axis, and the axis of the crown gear in the case of at least one member of the pair being offset from the axis of the gear blank being cut.

12. The method of producing a pair of hypoid gears which consists in generating the side tooth surfaces of each member of the pair by moving a tool in a straight path across the face of a tapered gear blank while rotating the blank on its axis and simultaneously moving the tool and blank relative to each other about another axis, the tool, in the case of one member of the pair at least, moving in a direction radially of said last named axis and said axis, in the case of one member of the pair at least, being offset from the axis of the blank being cut.

13. The method of generating the side tooth surfaces of a hypoid gear which consists in reciprocating a pair of planing tools in converging paths across the face of a tapered gear blank, while rotating the blank on its axis and simultaneously imparting an additional relative movement between the tools and blank about an axis passing through the point of convergence of the tool paths and offset from the blank axis.

14. The method of generating the side tooth surfaces of a hypoid gear which consists in reciprocating a pair of planing tools, representing side tooth faces of a crown gear provided with straight radial teeth, across the face of a tapered gear blank in converging paths, while imparting a relative rolling movement between said tools and blank in the manner of a gear rolling on said crown gear with its axis offset from the axis of said crown gear.

15. The method of producing a pair of hypoid gears, which consists in generating the side tooth surfaces of each member of the pair by reciprocating a pair of planing tools in converging paths across the face of a tapered gear blank, while rotating the blank on its axis and simultaneously imparting an additional relative movement between the tools and blank about another axis, the latter axis, in the case of one member of the pair at least, being offset from the axis of the blank, and said axis, in the case of one member of the pair at least, extending through the point of convergence of the tool paths.

16. The method of producing a pair of hypoid gears, which consists in generating the side tooth surfaces of each member of the pair by reciprocating a pair of planing tools across the face of a tapered gear blank in converging paths, while imparting a relative rolling movement between the tools and blank in the manner of a gear rolling on a crown gear, whose axis, in the case of one member of the pair at least, is offset from the blank axis.

17. The method of producing a pair of hypoid gears, which consists in generating the side tooth surfaces of each member of the pair by reciprocating a pair of planing tools representing side tooth surfaces of a crown gear provided with straight radial teeth, across the face of a tapered gear blank in converging paths, while imparting a relative rolling movement between the tools and blank in the manner of a gear rolling on a crown gear, whose axis, in the case of one member of the pair at least, passes through the point of convergence of the tool paths, and whose axis, in the case of one member of the pair at least, is offset from the axis of the blank.

18. The method of generating the side tooth surfaces of a hypoid gear which consists in moving a pair of cutting edges across the face of a tapered gear blank to cut two adjacent side faces of the blank simultaneously, while imparting a relative rolling movement between said cutting edges and the blank in the manner of a gear rolling with a crown gear with its axis offset from the axis of the crown gear.

19. The method of producing a pair of hypoid gears, which consists in generating the side tooth faces of each member of the pair, by moving a pair of cutting edges across the face of a tapered gear blank to cut two adjacent faces simultaneously, while imparting a relative rolling movement between said cutting edges and the blank in the manner of a gear rolling with a crown gear whose axis, in the case of at least one member of the pair, is offset from the axis of the blank.

20. The method of producing a pair of hypoid gears, which consists in generating the side tooth faces of each member of the pair by moving a pair of cutting edges across the face of a tapered gear blank to cut two adjacent tooth faces simultaneously, while rotating the blank on its axis and simultaneously imparting an additional relative movement between the cutting edges and blank about an axis offset from the blank axis.

21. The method of producing a pair of hypoid gears which consists in generating the side tooth faces of each member of the pair by moving a pair of cutting edges across the face of a tapered gear blank to cut two adjacent tooth faces simultaneously, while rotating the blank upon its axis and simultaneously imparting an additional relative movement between the cutting edges and blank about another axis, the latter axis, in the case of at least one member of the pair, being offset from the blank axis.

22. The method of producing a hypoid gear which consists in generating its side tooth surfaces by moving a tool in a straight path across the face of a tapered gear blank and simultaneously imparting a relative rolling movement between the tool and blank in the manner of a gear meshing with a crown gear, the axis of the blank being maintained, during said operation, offset from the axis of the crown gear with the blank apex lying outside a line drawn from the crown gear apex perpendicular to the projection of the blank axis into the pitch surface of the crown gear.

23. The method of producing a pair of hypoid gears, which consists in generating the side tooth surfaces of each member of the pair by moving a tool across the face of a tapered gear blank while rotating the blank on its axis and simultaneously producing an additional relative movement between the tool and blank about another axis, the blank, in the case of at least one member of the pair, being maintained during the operation, with its axis offset from the last named axis and with its apex outside a line drawn from the last named axis perpendicular to the projection of the blank axis into a plane tangent to the pitch surface of the blank and perpendicular to said axis.

24. The method of producing a pair of hypoid gears, which consists in generating the side tooth surfaces of each member of the pair by moving a tool in a straight line across the face of a tapered gear blank, while rotating the blank on its axis and simultaneously producing an additional relative movement between the tool and blank about another axis, the blank, in the case of at least one member of the pair, being maintained during the operation, with its axis offset from said last named axis and with its apex outside a line drawn from said last named axis perpendicular to the projection of the 25. The method of producing a pair of hypoid gears, which consists in generating the side tooth surfaces of each member of the pair by moving a tool across the face of a tapered gear blank while imparting a relative rolling motion between the tool and blank in the manner of a gear meshing with a crown gear, the axis of the blank, in the case of at least one member of the pair being maintained, during said operation, offset from the axis of the crown gear with its apex outside a line drawn from the crown gear axis perpendicular to the projection of the blank axis into the pitch surface of the crown gear.

26. The method of producing a pair of hypoid gears which consists in generating the side tooth surfaces of each member of the pair by moving a tool in a straight line across the face of a tapered gear blank while imparting a relative rolling movement between the tool and blank in the manner of a gear meshing with a crown gear, the blank, in the case of at least one member of the pair, being maintained during said operation, with its axis offset from the axis of the crown gear and with its apex outside a line drawn from the crown gear axis perpendicular to the projection of the blank axis into the pitch surface of the crown gear.

27. The method of producing a hypoid gear which consists in generating its side tooth surfaces by moving a tool across the face of a gear blank in a straight line offset from the blank apex, while rotating the blank on its axis and simultaneously moving the tool and blank relatively to each other about an axis intersecting said straight line in a point offset from the blank axis, the apex of the blank being maintained during the operation, outside a line drawn from said last named axis perpendicular to the projection of the blank axis into a plane tangent to the pitch surface of the blank and perpendicular to said axis.

28. The method of producing a hypoid gear which consists in generating its side tooth surfaces by moving a tool in a straight line across the face of a tapered gear blank, while imparting a relative rolling movement between the tool and blank in the manner of a gear meshing with a crown gear having straight radial teeth, whose axis intersects said straight line and is offset from the axis of the blank, the apex of the blank being maintained during said operation outside a line drawn from the crown gear axis perpendicular to the projection of the blank axis into the pitch surface of the crown gear.

29. The method of producing a pair of hypoid gears, which consists in generating the side tooth surfaces of each member of the pair by moving a tool in a straight path across the face of a tapered gear blank while imparting a relative rolling movement between the tool and blank in the manner of a gear meshing with a crown gear whose axis, in the case of at least one member of the pair, intersects the straight line path of the tool and is offset from the axis of the blank, the apex of the blank in the case of such member being maintained outside the line drawn from the crown gear center perpendicular to the projection of the blank axis into the pitch surface of the crown gear.

30. The method of producing a pair of hypoid gears, which consists in generating the side tooth surfaces of each member of the pair by moving a tool in a straight path across the face of a tapered gear blank while rotating the blank on its axis and simultaneously producing an additional relative movement between the tool and blank about another axis which, in the case of one member of the pair at least, intersects the straight line path of the tool and is offset from the axis of the blank, the apex of the blank in the case of such member being maintained, during the operation, outside a line drawn from said axis perpendicular to the projection of the blank axis into a plane tangent to the pitch surface of the blank and perpendicular to said axis.

31. The method of producing a hypoid gear which consists in generating two side tooth surfaces of the gear simultaneously by moving a pair of planing tools in converging paths across the face of a tapered gear blank while imparting a relative rolling movement between the tools and blank in the manner of a gear meshing with a crown gear having straight radial teeth, whose axis passes through the point of convergence of the tool paths and is offset from the axis of the blank, the apex of the blank being maintained during the operation, outside a line drawn from the crown gear axis perpendicular to the projection of the blank axis into the pitch surface of the crown gear.

32. The method of producing a pair of hypoid gears which consists in generating two side tooth surfaces of each member of the pair simultaneously by moving a pair of tools in converging paths across the face of a tapered gear blank and imparting a relative rolling movement between the tools and blank in the manner of a gear meshing with a crown gear whose axis, in the case of at least one member of the pair, passes through the point of convergence of the tool paths and is offset from the axis of the blank, the apex of the blank, in the case of such member, being maintained outside a line drawn from the crown gear center perpendicular to the projection of the blank axis into the pitch surface of the crown gear.

33. The method of producing a pair of hypoid gears which consists in generating two side tooth surfaces of each member simultaneously by reciprocating a pair of planing tools in converging paths across the face of a tapered gear blank while rotating the blank on its axis and simultaneously imparting an additional relative movement between the tools and blank about another axis, which in the case of one member of the pair at least, passes through the point of convergence of the tool paths and is offset from the blank axis, the apex of the blank, in the case of such member, being maintained, during the operation outside a line drawn from said last named axis perpendicular to the projection of the blank axis into a plane tangent to the pitch surface of the blank and perpendicular to said axis.

34. The method of producing a pair of hypoid gears which consists in generating two side tooth surfaces of each member of the pair simultaneously by moving a pair of planing tools in converging paths across the face of a tapered gear blank while imparting a relative rolling movement between the tools and blank in the manner of a gear meshing with a crown gear, whose axis, in the case of at least one member of the pair, passes through the point of convergence of the tool paths, and whose axis, in the case of at least one member of the pair is offset from the blank axis, the apex of the blank being maintained, in the latter case, during the cutting of the blank, outside a line drawn from the crown gear center perpendicular to the projection of the blank axis into the pitch surface of the crown gear.

35. The method of producing a pair of hypoid gears, which consists in generating the side tooth surfaces of each member by moving a pair of planing tools in straight converging paths across the face of the blank to cut two side surfaces of the blank simultaneously while rotating the blank on its axis and simultaneously moving the tool and blank relatively to each other about another axis, which, in the case of one member of the pair at least, passes through the point of convergence of the tool paths, and the blank, in the case of one member of the pair at least being positioned with its axis offset from said last named axis and with its apex outside a line drawn from said last named axis perpendicular to the projection of the blank axis into a plane tangent to the pitch surface of the blank and perpendicular to said axis.

36. The method of producing a pair of hypoid gears which consists in generating the side tooth surfaces of each member of the pair by moving a tool, representing a tooth surface of a crown gear in a straight line across the face of a tapered gear blank, while imparting a relative rolling movement between the tool and blank in the manner of a gear meshing with a crown gear with its axis offset from the axis of the crown gear, and proportioning said gears so that the cutting edge of the tool contacts with the tooth surfaces of the two blanks along different lines which intersect in a point which travels substantially from the top to the bottom of the crown gear tooth surface represented by the tool during the generation of either gear.

37. The method of producing a pair of hypoid gears which consists in generating the side tooth surfaces of each member of the pair by moving a tool, representing a tooth surface of a crown gear, across the face of a tapered gear blank while imparting a relative rolling movement between the tool and blank in the manner of a gear meshing with a crown gear with its axis offset from the axis of the crown gear, and proportioning said gears so that their side tooth surfaces will contact along a line which is perpendicular to the general direction of the teeth.

38. The method of producing a pair of hypoid gears which consists in producing the side tooth surfaces of each member in a generating operation by a rolling motion between the tool employed and a tapered gear blank and proportioning said gears so that during the rolling operation the line of contact between the tool and tooth side of the blank being generated travels from the top to the bottom of the tooth at the same rate on mating tooth sides.

39. The method of producing a pair of hypoid gears which consists in producing the side tooth surfaces of each member in a generating operation by moving a tool in a straight path across the face of a tapered gear blank and simultaneously producing a relative rolling motion between the tool and blank in the manner of a gear rolling with a crown gear, the axis of which is offset from the axis of the blank, and proportioning said gears so that during the rolling operation, the line of contact between the cutting edge of the tool and the side tooth surface of the blank being generated travels from the bottom to the top of the tooth surface at the same rate on mating tooth sides.

40. The method of producing a pair of hypoid gears which consists in producing the side tooth surfaces of each member of the pair in a generating operation by moving a tool in a straight path across the face of a tapered gear blank and simultaneously producing a relative rolling motion between the tool and blank in the manner of a gear rolling with a crown gear, the axis of which is offset from the axis of the blank, and proportioning said gears so that they mesh in development along a line which in a plane tangent to the pitch surfaces of both lies between the gear and pinion axes projected into said plane.

41. The method of producing the side tooth surfaces of a hypoid gear which consists in moving a tool in a straight line across the face of a tapered gear blank by imparting a relative rolling movement between the tool and the blank corresponding to that of a gear rolling with a crown gear whose axis is offset from the axis of the blank.

42. The method of producing the side tooth surfaces of a hypoid gear which consists in moving a tool in a straight line across the face of a tapered gear blank by imparting a relative movement between the tool and the blank corresponding to that of a gear meshing with a crown gear whose axis is offset from the blank axis and intersects the tool path.

ERNEST WILDHABER.